July 21, 1970  T. D. SAMPSON ET AL  3,521,366
VISUAL LIQUID LEVEL MEASURING DEVICE
Filed July 28, 1969
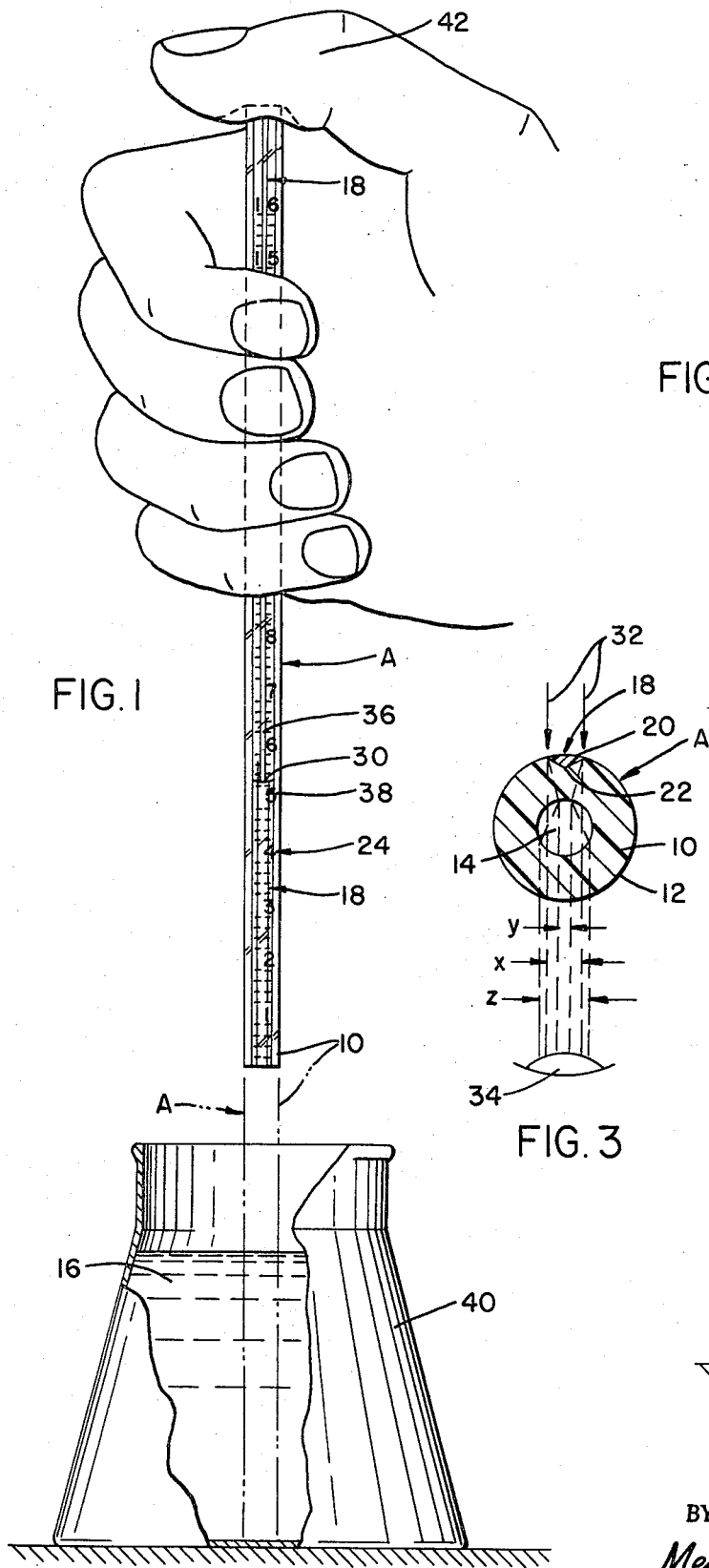
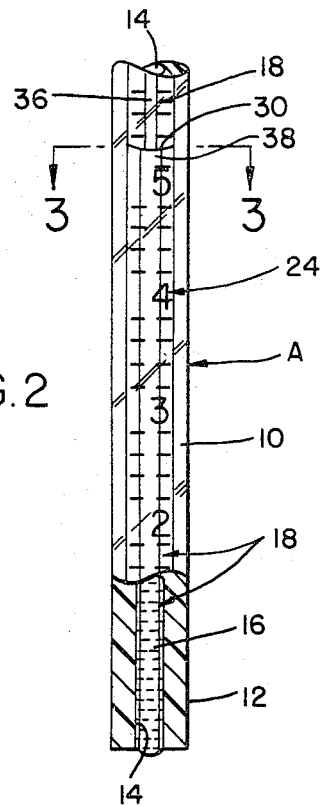
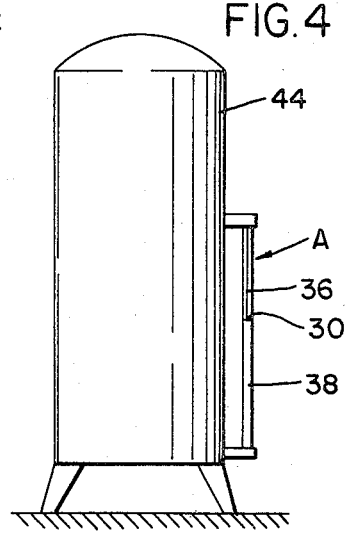
INVENTOR.
THOMAS DAVID SAMPSON
JAMES ANTHONY MARKWALD
BY
Meyer, Tilberry & Body
ATTORNEYS

United States Patent Office 3,521,366
Patented July 21, 1970

3,521,366
VISUAL LIQUID LEVEL MEASURING DEVICE
Thomas David Sampson, Rootstown, and James Anthony Markwald, Cuyahoga Falls, Ohio, assignors to Norton Company, Worcester, Mass., a corporation of Massachusetts
Filed July 28, 1969, Ser. No. 845,402
Int. Cl. G01f 23/02
U.S. Cl. 33—126.4         7 Claims

ABSTRACT OF THE DISCLOSURE

A device to facilitate the visual measurement of the level of a liquid in a sight tube and having an elongated, transparent tubular body member which includes a triangular shaped stripe embedded therein parallel to its length. The cross section of the stripe increases in dimension as it extends radially through the body member towards the outer surface thereof whereby the width of the stripe will appear wider when viewed through the liquid then when viewed through the air.

---

This invention pertains to the measuring art and more particularly to a measuring device having easy reading characteristics.

The invention is particularly applicable to measuring devices in which it is necessary to determine the height of a column of liquid in a tube; however, it is to be appreciated that the invention has broader applications and may be used whenever it is desired to visually determine the level of fluid in a container.

In today's scientifically oriented world, there are numerous examples of measuring devices which, used either alone or in conjunction with other apparatus, require the visual determination of the height of a column of fluid. Such devices are usually comprised of an elongated, transparent, body member having an internal passageway through which the fluid is adapted to flow. A typical example of such a device is the conventional thermometer, the application of which requires the user to determine the height of a column of mercury relative to a scale imprinted on the outside of the body member. Another typical example is a blood pressure machine, the use of which requires a physician to view a column of falling mercury relative to a scale in order to determine the patient's blood pressure.

In the above referred examples, the fluid in the internal passageway of the body member is opaque. Due to this characteristic, it is not difficult for the user to determine the location of the interface between the fluid and air in the internal passageway, relative to a scale imprinted on the outer surface of the body member. However, in certain applications, the fluid contained within the internal passageway is transparent. In such instances it becomes very difficult to determine its location within the body member. This problem is magnified when accurate rapid measurements are required, thus necessitating an exact determination at a glance of the location of the fluid-air interface relative to the scale.

The present invention contemplates a new and improved measuring device which overcomes the above referred problem and others, and provides a means for easily determining the level of fluid in the internal passageway of a body member.

In accordance with the present invention there is provided a device for measuring the level of fluid, comprising: an elongated, transparent body member having an outer surface and an internal passageway through which the fluid is adapted to flow; and means facilitating a visual determination of fluid level, extending longitudinally throughout a substantial portion of the length of the body member; said means being opaque, and integral with and embedded in the body member and having a cross section which increases in dimension as it extends radially through the body member toward the outer surface thereof, whereby the width of said means appears wider when viewed through the fluid than it does when viewed through air, thus facilitating the visual determination of the location of the interface between the fluid and air.

The principal object of the present invention is to provide an improved measuring device wherein the level of fluid in the device may be easily determined.

Another object of the present invention is to provide an improved measuring device which may be used in either a horizontal or vertical position.

A further object of the present invention is to provide an improved measuring device which is easy and economical to manufacture.

These and other objects and advantages will become apparent from the following description used to illustrate the preferred embodiment of the invention when read in conjunction with the accompanying drawings in which:

FIG. 1 illustrates the general operational features of a measuring device constructed in accordance with the preferred embodiment of the subject invention;

FIG. 2 is an enlarged view, partly broken away, of a portion of the measuring device of FIG. 1;

FIG. 3 is a cross-sectional view taken along line 3—3 of FIG. 2; and

FIG. 4 illustrates the use of the subject invention in conjunction with a conventional steam boiler.

Referring now to the drawings wherein the showings are for the purpose of illustrating the preferred embodiment of the subject invention only and not for the purpose of limiting same, FIG. 2 shows a segment of a measuring device, designated generally by the reference letter A, formed according to the present invention.

Reference is now made to FIGS. 2 and 3 wherein the measuring device is illustrated as comprising an elongated body member 10 having an outer surface 12 and an internal passageway 14 through which a fluid, such as water 16, is adapted to flow. It is to be appreciated that although water has been designated as the fluid, this has been done for purposes of illustration only, the measuring device A being suitable for use with any fluid. The body member 10 can be manufactured from any transparent material such as glass or plastic, the selection of which would depend upon the rigidity desired and the type of fluid which is to flow through the internal passageway 14. If plastic is used, it is possible to construct measuring devices which can either be rigid or quite flexible, depending upon the requirements of the particular application.

In accordance with the measuring device of the present invention, there is provided means facilitating a visual determination of fluid level which may take a variety of forms such as a semi-circular or diamond-shaped stripe; however, in the preferred embodiment it takes the form of a triangular stripe, designated generally by the reference numeral 18, which extends longitudinally throughout a substantial portion of the length of the body member 10. The stripe 18 is opaque and integral with and embedded in the body member 10, and is so located that one of the legs 20 of the triangular stripe forms a segment of the outer surface 12 of the body member. The apex 22, formed by the intersection of the other two legs of the triangular stripe 18, lies substantially within a plane that passes through the diameter of the internal passageway 14. As such, the triangular stripe 18 increases in dimension as it extends radially through the body member 10 toward the outer surface 12 thereof. Disposed on the outer surface 12 of the body member 10 is a scale, designed generally by the reference numeral 24, graduated in units of measure. The configuration of the scale 24 will vary depending upon the particular application to which the measuring device A is being put. Thus for example, the scale 24 could be graduated in units of length, pressure, or temperature. The scale 24 is disposed on that segment of the outer surface 12 which is diametrically opposed to that segment of the outer surface defined by the leg 20 of the triangular stripe 18. In this manner, the apex 22 of the triangular stripe 18 is pointed substantially at the center line of the scale 24.

When water 16 is introduced into the internal passageway 14, an interface 30 is formed between it and the air which fills the remainder of the internal passageway. Heretofore, whenever water 16, or any other generally transparent fluid, was used in such a measuring device, it was quite difficult to determine the location of the interface 30 with respect to the scale 24. However, the triangular stripe 18 creates a unique optical effect which permits the interface 30 to be rapidly and accurately located relative to the scale 24.

As shown in FIG. 3, the stripe 18, when viewed through the scale 24, has an actual transverse dimension represented by the letter $x$. Light rays, as represented by lines 32, passing through the body member 10 from the direction of the stripe 18 toward the scale 24, are refracted inwardly toward the center line of the body member 10. When air is in the internal passageway 14, the refracted light rays 32, as viewed by the user of the measuring device A, represented by an eye 34, cause the stripe 18 to appear as a very narrow band 36 having a transverse dimension $y$, which is less than the dimension $x$. However, when water 16 is in the internal passageway 14, the light rays 32 are refracted outwardly from the center line of the body member 10, thereby causing the stripe 18 to appear to the eye 34 as a band 38 having a transverse dimension $z$, which is greater than the dimension $x$. As a result of the difference in transverse dimensions between the narrow band 36 and the wide band 38, the interface 30 between the fluid and air can be rapidly located, thereby permitting accurate measurements to be easily made.

Although a variety of material can be used to construct the subject invention, preferably the body member is formed from extruded synthetic organic plastic materials such as: cellulose ester resins, for example cellulose butyrate and cellulose propionate; acrylics, for example polyethyl acrylate and polymethyl methacrylate; polyethylene vinyl acetate; polystyrene; and clear aminoplasts, for example melamine. The stripe 18 can be formed from either the same material as the body member 10 or from a different but compatible material, and is made opaque by the addition of pigments to the striping material such as titanium dioxide if a white stripe is desired or carbon black in order to obtain a black stripe. It is to be appreciated that a variety of coloring agents can be used in order to achieve the desired effect. The use of such coloring agents produces an opaque stripe having substantially homogeneous color characteristics. The body member 10 and stripe 18 preferably are simultaneously extruded, using, for example, the method described in U.S. Pat. No. 2,233,987.

Reference is now made to FIG. 1, wherein the measuring device A is being used to determine the height of the water 16 in a container 40. In this application, the user inserts measuring device A in the container 40, placing his thumb 42 over the upper end of the body member 10 in order to seal off the internal passageway 14, thereby causing the water 16 to remain therein at a height corresponding to the height of the water in the container. Upon removing the measuring device A from the container 40, it is possible to rapidly and accurately locate the interface 30 relative to the scale 24, due to the difference in transverse dimensions between the narrow band 36 and the wide band 38.

Reference is now made to FIG. 4, wherein the measuring device A is employed as a sight tube in order to determine the height of water 16 in a conventional steam boiler 44. In this application the measuring device A is hydraulically connected to the water chamber of the steam boiler 44, thereby permitting the water 16 to be at the same level in both the measuring device and steam boiler. Once again it can be seen that the interface 30 is readily locatable in view of the difference in transverse dimensions between the narrow band 36 and wide band 38.

Having thus described our invention, we claim:

1. A device for measuring the level of a fluid comprising: an elongated, transparent, body member having an outer surface and an internal passageway through which the fluid is adapted to flow; and means facilitating a visual determination of fluid level, said means extending longitudinally through a substantial portion of the length of said body member; said means being opaque, integral with and embedded in said body member parallel to said internal passageway and having a cross section which increases in dimension as it extends radially through said body member toward the outer surface thereof, whereby the width of said means appears wider when viewed through said fluid than it does when viewed through air, thus facilitating the visual determination of the location of the interface between the fluid and air.

2. The measuring device defined in claim 1, wherein said means is a continuous stripe having substantially homogeneous color characteristics.

3. The measuring device defined in claim 1, wherein said body member is cylindrical and substantially rigid.

4. The measuring device defined in claim 1, wherein said means has a generally triangular cross-section.

5. The measuring device defined in claim 4, wherein one of the sides of said triangular cross-section forms a portion of said outer surface of said body member.

6. The measuring device defined in claim 1, further including a measuring scale imprinted on said body member.

7. The measuring device defined in claim 6, wherein said scale is longitudinally disposed on said outer surface of said body member and generally opposite the longitudinal extension of said means.

References Cited

UNITED STATES PATENTS

| | | | |
|---|---|---|---|
| 2,179,773 | 11/1939 | Young | 350—112 X |
| 2,233,987 | 3/1941 | Orsini | 264—209 X |
| 2,468,218 | 4/1949 | Markham | 33—126.4 |
| 2,782,514 | 2/1957 | Scott et al. | 33—126.4 |
| 3,304,784 | 2/1967 | Asher. | |
| 3,417,730 | 12/1968 | Colley et al. | 116—118 |

S. CLEMENT SWISHER, Primary Examiner

D. M. YASICH, Assistant Examiner

U.S. Cl. X.R.

73—323; 350—286